Figure 1:
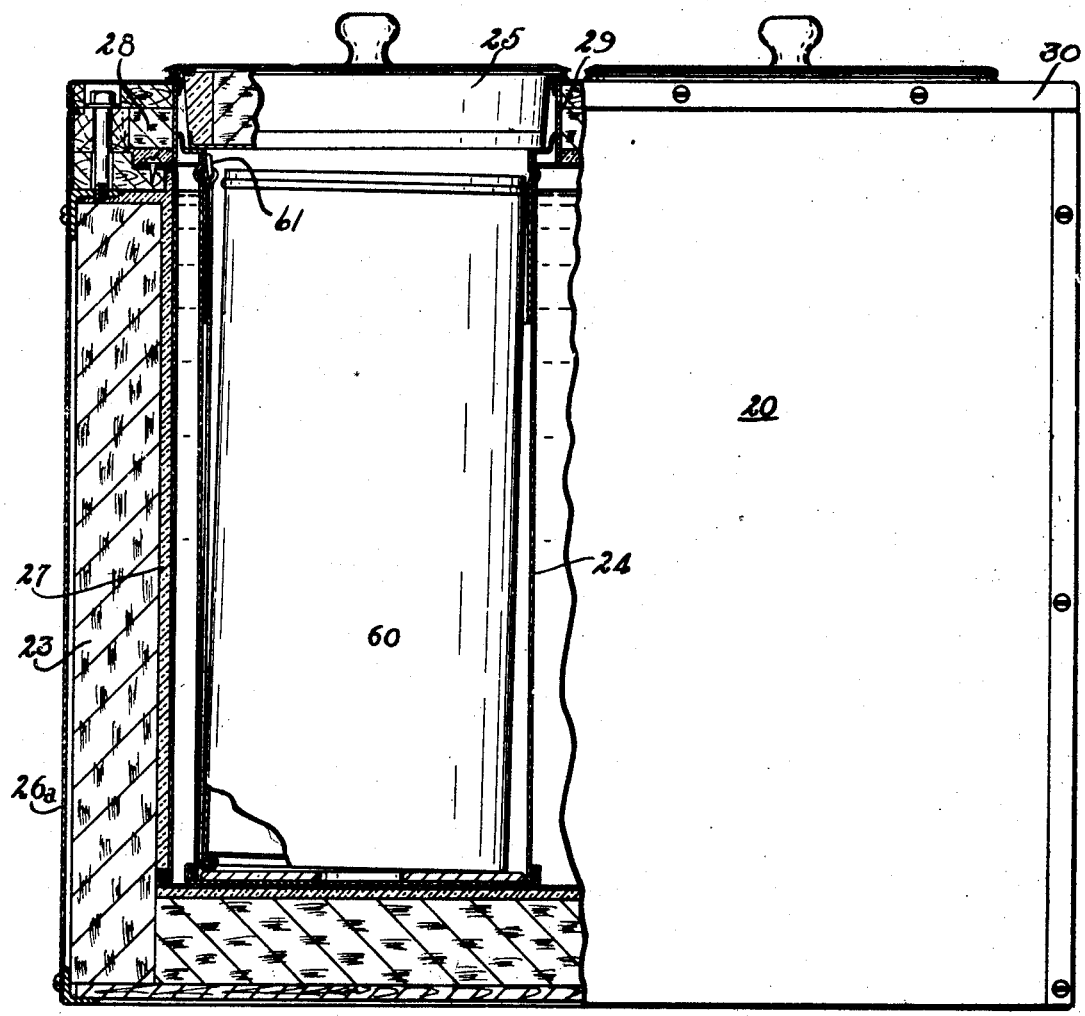

June 25, 1929.  J. R. FEHR  1,718,281

REFRIGERATING APPARATUS

Filed Feb. 29, 1928

John Ralph Fehr, Inventor

Patented June 25, 1929.

1,718,281

UNITED STATES PATENT OFFICE.

JOHN RALPH FEHR, OF DAYTON, OHIO, ASSIGNOR TO FRIGIDAIRE CORPORATION, OF DAYTON, OHIO, A CORPORATION OF DELAWARE.

REFRIGERATING APPARATUS.

Application filed February 29, 1928. Serial No. 257,960.

This invention relates to refrigerating apparatus and more particularly to ice cream cabinets and to a method of storing ice cream in said cabinets.

An object of this invention is to provide more complete refrigeration in the zone of a food compartment immediately adjacent its food removal opening.

Another object of this invention is to prevent the melting of the upper layer of ice cream stored in the compartment of an ice cream cabinet.

Another object of this invention is to provide a lid for an ice cream cabinet provided with means for preventing the melting of the upper layer of ice cream stored in the cabinet.

Another object of this invention is to provide means for positively conducting away the heat units at the opening of the ice cream compartment of an ice cream cabinet.

Another object of this invention is to provide a method of storing ice cream in an ice cream cabinet in a manner to prevent the melting of the upper layers of ice cream.

Further objects and advantages of the present invention will be apparent from the following description, reference being had to the accompanying drawings, wherein a preferred form of the present invention is clearly shown.

Figure 2:
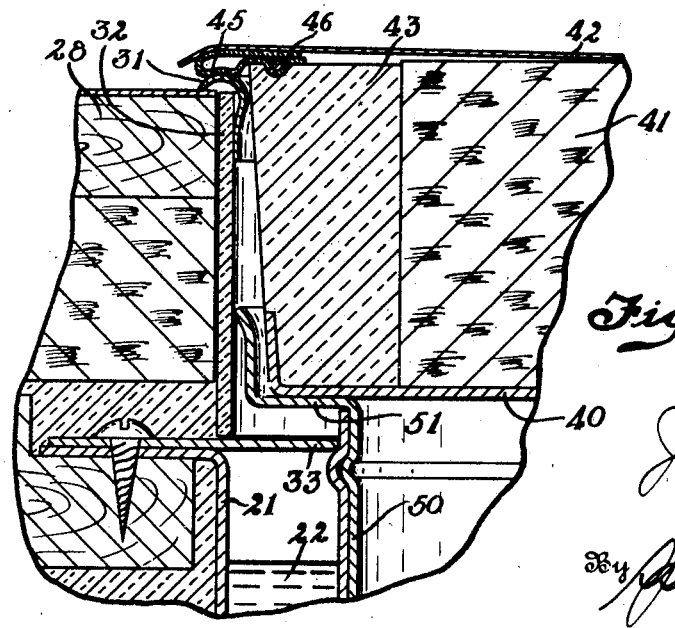

In the drawings:

Fig. 1 is a side elevation partly in cross-section of an ice cream cabinet embodying my invention; and Fig. 2 is an enlarged detailed view of a portion of Fig. 1.

An ice cream cabinet, or food storage device, in which features of my invention may be embodied is generally designated as 20. It may comprise a tank 21 for holding a refrigerating medium such as brine 22; insulation 23 for the tank 21, one or more ice cream compartments 24 adapted to be placed within the tank 21 and sealing means such as a lid 25, for the ice cream compartments 24. The brine 22 may be chilled either by mechanical refrigeration or by ice, as is well understood.

The tank 21 may be covered with the insulation 23 which may comprise slabs of cork cemented to the tank 21 by means of an asphaltic cement 27. The insulation 23 may be extended above the tank 21 and may form insulation at the top for the cabinet, generally designated as 28. The top 28 may be provided with openings 29 for access to the ice cream compartments 24. A suitable outside metallic shell 26ª may be placed around the insulation 23 and an upper metallic cover 30 may be placed over the upper portion of the insulation. At the openings 29 cylindrical beads 31 may hold in place rings 32 of insulating material which line the openings 29. A cover 33 may be provided for the tank 21 and this cover 33 may be provided with openings for the reception of the ice cream compartments 24. The ice cream compartments 24 may extend upwardly from the tank through the openings in the cover 33. Lids 25 are adapted to be placed in the openings 29 of the cabinet. The lids may comprise a lower layer 40 of heat conducting material and an upper layer 41 of insulating material and, if desired, a protecting layer 42 of resilient metal or other hard substance. A ring 43 of molded material may surround the main or cork portion of the insulation 41 and may space the layer 40 from the layer 42. An upper seal 45 of very elastic material may be provided on the lid 25, adapted to rest on the bead 31 of cabinet. A way of attaching this bead to the lid may be by securing the seal 45 between the upper layer 42 and the ring of molded material 43, an enlargement 46, formed by a wire or the like, catching in a groove formed in ring 43. If necessary, additional fastening means, not shown, may be provided. An extension 50 for the compartment 24 may be provided and this extension 50 is adapted to be in thermal contact with the refrigerating medium 22 through the walls of the compartment 24 and is also adapted to be in thermal contact with the heat conducting layer 40 of the lid 25. For this purpose, a shoulder 51 may be provided in the extension 50, in order to increase its thermal contact with the layer 40. Any other suitable means of providing a thermal contact between the layer 40 and the refrigerating medium 22 may be used.

After the ice cream has been stored in the compartment 24, as by placing the ice cream in its usual container 60 therein with the aid of lifting hook 61, the lid 25 may be placed over the compartment 24. Because of the thermal contact between the layer 40 and the refrigerating medium 22, and because of the heat conducting nature of layer 40, a refrigerating zone is created over the stored ice cream at the opening of the compartment 24, and this refrigerating zone is insulated from the surrounding atmosphere by the layer of insulation 41 of the lid 25. In this manner, the relatively warm zone heretofore existing in ice cream cabinets at this point is removed by the refrigerating effect of the cold layer 40 of the lid 25. Softening of the upper layer of the ice cream in the compartment is thus prevented.

The seal 45 is sufficiently resilient so that when the lid 25 is placed in the openings 29 this member gives sufficiently to insure a good thermal contact between the shoulder 51 and the layer 40. The seal 45 creates a relatively good insulating medium in the space between the lid 25 and the insulation 28 by sealing the air at this point.

Thus I have invented a new and useful method of storing ice cream, in which a refrigerating zone is created over the stored ice cream at the opening through which the ice cream is to be inserted or taken out of the ice cream cabinet. To practice this method any means of securing the refrigerating zone at the opening may be used.

While the form of embodiment of the invention as herein disclosed, constitutes a preferred form, it is to be understood that other forms might be adopted, all coming within the scope of the claims which follow.

What is claimed is as follows:

1. An ice cream cabinet comprising a tank for refrigerating liquid, a cover for said tank having an opening, an ice cream compartment in said tank including a metal sleeve permanently secured in said cabinet and adapted to extend into and above said liquid and touching the edge of said opening, an insulated top for said cabinet having an opening in alignment with said sleeve, a unitary cover for said ice cream compartment and for said last named opening, said cover including a metal plate adapted to fit on the side wall of said sleeve and to extend across the sleeve, said cover also including an insulated portion for sealing said last named opening in said top, and means for removing said cover as a unit from its normal position in said cabinet.

2. A cabinet comprising a tank for refrigerating liquid, a cover for said tank having an opening, a compartment in said tank including a metal sleeve permanently secured in said cabinet and adapted to extend into and above said liquid and touching the edge of said opening, a top for said cabinet having an opening in alignment with said sleeve, a cover for said compartment and for said last named opening, said cover including a metal plate on the under side thereof having metallic thermal contact with the sleeve, said cover also including an insulated portion for sealing said last named opening in said top.

3. An ice cream cabinet having a refrigerated metallic sleeve forming an ice cream compartment, an insulated top for said cabinet having an opening in alignment with said sleeve, a unitary cover for said ice cream compartment and for said opening, said cover including a bottom metal plate having a flat portion adapted to fit on the side wall of said sleeve and to extend across the sleeve, said cover also including an insulated portion for sealing said opening in said top and including a ring, the edge of said plate being secured to said ring, and means for removing said cover as a unit from its normal position in said cabinet.

4. A cabinet comprising a tank for refrigerating liquid, a cover for said tank having an opening, a compartment in said tank including a metal sleeve adapted to extend into and above said liquid to the edge of said opening, a top for said cabinet having an opening in alignment with said sleeve, a cover for said compartment and for said last named opening, adapted to seal the air in said sleeve and including a metal plate having contact with the air in said sleeve and refrigerated by metallic thermal connection with the refrigerating liquid adjacent to said sleeve, said cover also including an insulated portion joined to said metallic plate for sealing said last named opening in said top.

In testimony whereof I hereto affix my signature.

JOHN RALPH FEHR.